(12) United States Patent
Park et al.

(10) Patent No.: US 9,829,069 B2
(45) Date of Patent: Nov. 28, 2017

(54) DISPLAY APPARATUS

(71) Applicant: SAMSUNG ELECTRONICS CO., LTD., Suwon-si (KR)

(72) Inventors: Jae Hoo Park, Suwon-si (KR); Jun Pil Oh, Suwon-si (KR); Gyu Sung Do, Seoul (KR)

(73) Assignee: SAMSUNG ELECTRONIC CO., LTD., Suwon-Si (KR)

( * ) Notice: Subject to any disclaimer, the term of this patent is extended or adjusted under 35 U.S.C. 154(b) by 125 days.

(21) Appl. No.: 14/751,297

(22) Filed: Jun. 26, 2015

(65) Prior Publication Data
US 2016/0040764 A1 Feb. 11, 2016

(30) Foreign Application Priority Data

Aug. 5, 2014 (KR) .................. 10-2014-0100257

(51) Int. Cl.
H05K 7/00 (2006.01)
H05K 5/00 (2006.01)
F16H 1/16 (2006.01)
G09F 9/30 (2006.01)
H04N 5/64 (2006.01)
G06F 1/16 (2006.01)
E05D 3/12 (2006.01)

(52) U.S. Cl.
CPC ............ F16H 1/16 (2013.01); G06F 1/1601 (2013.01); G09F 9/301 (2013.01); H04N 5/64 (2013.01); E05D 3/12 (2013.01); E05Y 2201/62 (2013.01); E05Y 2201/716 (2013.01); E05Y 2201/722 (2013.01); E05Y 2900/606 (2013.01)

(58) Field of Classification Search
CPC .......................................................... G06F 1/16
USPC .................................................... 361/679.21
See application file for complete search history.

(56) References Cited

U.S. PATENT DOCUMENTS

2014/0247566 A1* 9/2014 Lee .......................... H05K 5/03
361/749
2015/0035812 A1* 2/2015 Shin ..................... G09G 3/3688
345/204

FOREIGN PATENT DOCUMENTS

| JP | 1026754 A | 1/1998 |
| JP | 10268790 A | 10/1998 |
| KR | 200447814 Y1 | 2/2010 |
| KR | 1020140033486 A | 3/2014 |

* cited by examiner

Primary Examiner — Jerry Wu
(74) Attorney, Agent, or Firm — Sughrue Mion, PLLC

(57) ABSTRACT

A display apparatus including: a display body including a display configured to display an image and a case disposed around an outside of the display; a handle unit disposed with at least a portion thereof outside the display body; and a link unit configured to linearly move and to vary a curvature of the display according to a rotational movement of the handle unit.

12 Claims, 12 Drawing Sheets

DISPLAY APPARATUS

CROSS-REFERENCE TO RELATED APPLICATION

This application claims the benefit of Korean Patent Application No. 10-2014-0100257, filed on Aug. 5, 2014 in the Korean Intellectual Property Office, the disclosure of which is incorporated herein by reference in its entirety.

BACKGROUND

1. Field

Exemplary embodiments relate to a display apparatus, and more particularly, to a display apparatus having a flexible display.

2. Description of the Related Art

In general, a display apparatus is an apparatus including a display module on which an image can be displayed. A display apparatus may be, as non-limiting examples, a television or a monitor. A display apparatus may have a display including an organic light emitting diode (OLED) panel.

Since the organic light emitting diode panel is formed of a material, which is bendable within a certain range, a display apparatus in which a display panel is fixedly installed in a curved state has been proposed. In the curved state, a user can partially experience three-dimensional effects similar to a three-dimensional image through a two-dimensional image.

However, a user may prefer a flat display rather than a curved display.

In addition, while the curved display may improve a sense of immersion of a single user, the curved display may inconvenience multiple users due to a limited viewing angle.

In addition, a flat display panel may display images more accurately than the curved display panel. A flat display panel may be more advantageous in certain circumstances, and less advantageous in other circumstances.

SUMMARY

Therefore, it is an aspect one or more exemplary embodiments to provide a display apparatus including a deformation apparatus configured to change a display between a flat state and a curved state.

In addition, it is another aspect one or more exemplary embodiments to provide a display apparatus provided with a deformation apparatus having a manual structure. Accordingly, a cost of the display apparatus may be reduced.

Additional aspects one or more exemplary embodiments will be set forth in part in the description which follows and, in part, will be obvious from the description, or may be learned by practice of one or more exemplary embodiments.

In accordance with one aspect of one or more exemplary embodiments, there is provided a display apparatus including: a display body including a display configured to display an image, and a case disposed around an outside of the display; a handle unit disposed with at least a portion thereof outside the display body; and a link unit configured to linearly move and to vary a curvature of the display according to a rotational movement of the handle unit.

The handle unit includes: a rotary dial configured to be gripped and rotated by a user; and a rotary gear disposed between a rear surface of the display and the case and configured to be rotated by a rotation of the rotary dial.

The link unit includes: a movable link including a gear meshed with the rotary gear; and a rotary link rotatably connected between the movable link and the display.

The movable link includes: a first movable link connected to an upper end of the rotary gear; and a second movable link connected to a lower end of the rotary gear.

The first movable link and the second movable link are configured to be moved in opposite directions according to the rotation of the rotary gear.

The rotary link includes: a first rotary support section rotatably connected to the display; a first hinge support section rotatably connected to the first movable link; a second rotary support section rotatably connected to the display; and a second hinge support section rotatably connected to the second movable link.

The rotary gear includes: a worm wheel; and a worm shaft including a worm meshed with the worm wheel. The rotary dial includes a handle configured to rotate the worm shaft as the handle is rotated.

The handle is disposed outside of the display body.

According to another aspect of one or more exemplary embodiments, there is provided a display apparatus including: a display body including a display configured to display an image; and a deformation mechanism configured to change the display between a flat state and a curved state. The deformation apparatus includes: a handle unit configured to be moved by a user manipulation, and a link unit configured to linearly move according to a movement of the handle unit.

The handle unit includes: a rotary gear disposed behind the display; and a rotary dial configured to rotate the rotary gear in response to the user manipulation.

The link unit includes: a movable link including a gear meshed with the rotary gear; and a rotary link rotatably connected to an end section of the movable link and rotatably connected to the display, and configured to deform the display in response to the user manipulation.

The movable link and the rotary link are coupled by a hinge.

The movable link includes: a first movable link connected to an upper end of the rotary gear; and a second movable link connected to a lower end of the rotary gear.

The first movable link and the second movable link are configured to be moved in opposite directions according to the rotation of the rotary gear.

The rotary link includes a rotary support section rotatably connected to an end section of the display.

The rotary gear includes: a worm wheel; and a worm shaft including a worm meshed with the worm wheel. The rotary dial includes a handle configured to rotate the worm shaft.

The handle is disposed outside of the display body.

According to another aspect of one or more exemplary embodiments, there is provided is a display apparatus including: a display body including a display configured to display an image; a pinion disposed behind the display; a first rack connected to an upper section of the pinion configured to be moved in a first direction; a second rack connected to a lower section of the pinion configured to be moved in a second direction opposite the first direction; a first rotary link connected to the first rack and configured to deform a first side of the display; a second rotary link connected to the second rack and configured to deform a second side of the display; and a handle unit configured to rotate the pinion.

The first rotary link is coupled to the first rack by a hinge and is rotatable with respect to the first rack, and the second rotary link is coupled to the second rack by a hinge and is rotatable with respect to the second rack.

The handle unit includes: a worm wheel connected to the pinion; a worm shaft including a worm meshed with the worm wheel; and a handle disposed on an end section of the worm shaft.

At least a portion of the handle is disposed outside of the display body.

According to another aspect of one or more exemplary embodiments, there is provided is a display apparatus including: a deformable display configured to display an image; and a deformation unit connected to the deformable display and configured to change a curvature of the deformable display according in accordance a force input by a user.

The deformation unit includes a linear actuator configured to translate a rotational force input by the user into a linear force, and the deformation unit is configured to change a curvature of the deformable display according in accordance with the input rotation force.

The linear actuator includes a plurality of moveable links configured to be moved linearly in accordance with the linear force.

The deformation unit further includes a plurality of rotary links connected to respective moveable links among the plurality of moveable links and connected to the deformable display, and, when the plurality of moveable links are moved, the plurality of rotary links change the curvature of the deformable display.

BRIEF DESCRIPTION OF THE DRAWINGS

These and/or other aspects of one or more exemplary embodiments will become apparent and more readily appreciated from the following description, taken in conjunction with the accompanying drawings of which.

DETAILED DESCRIPTION

Figure 1:
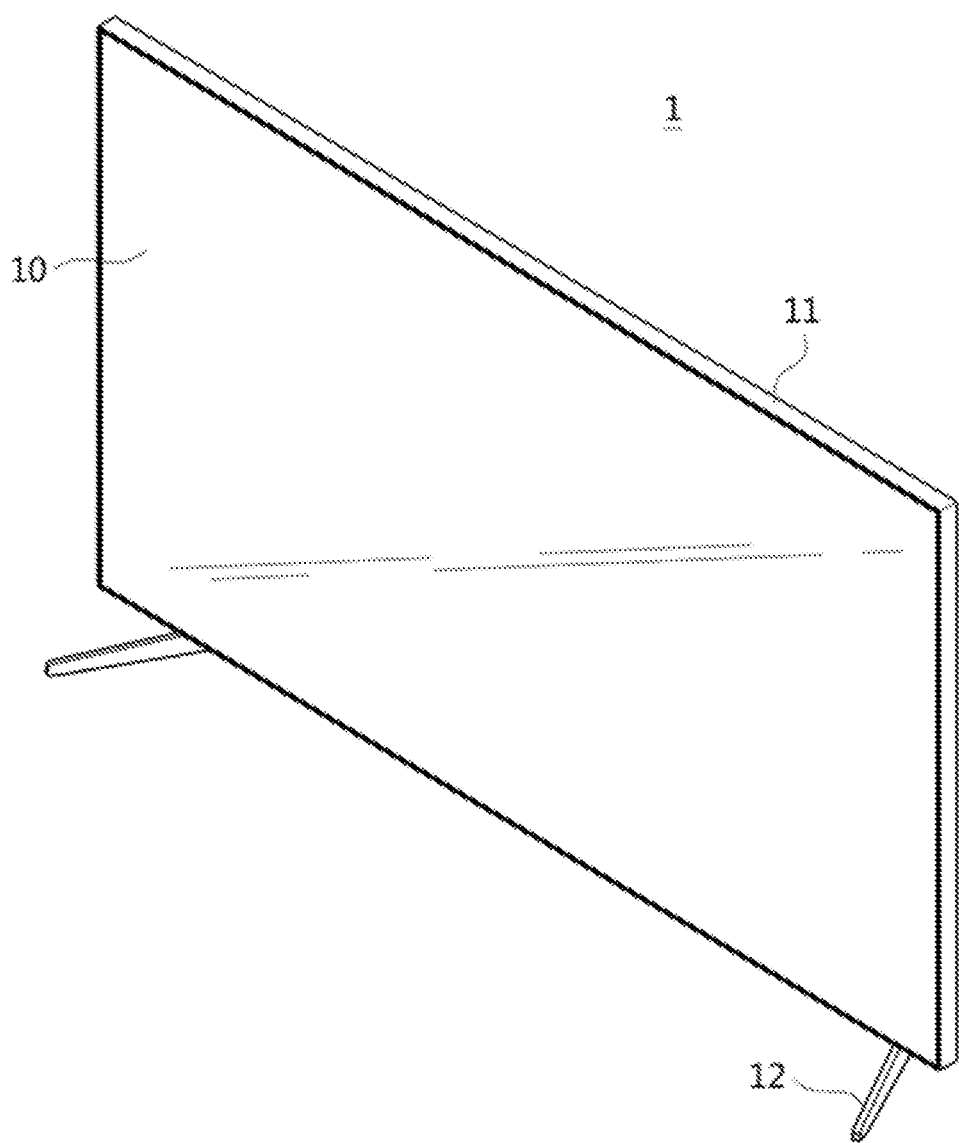
FIG. 1 is a perspective view of a display apparatus according to an exemplary embodiment.

Reference will now be made in detail to one or more exemplary embodiments, examples of which are illustrated in the accompanying drawings, wherein like reference numerals refer to like elements throughout.

Figure 2:
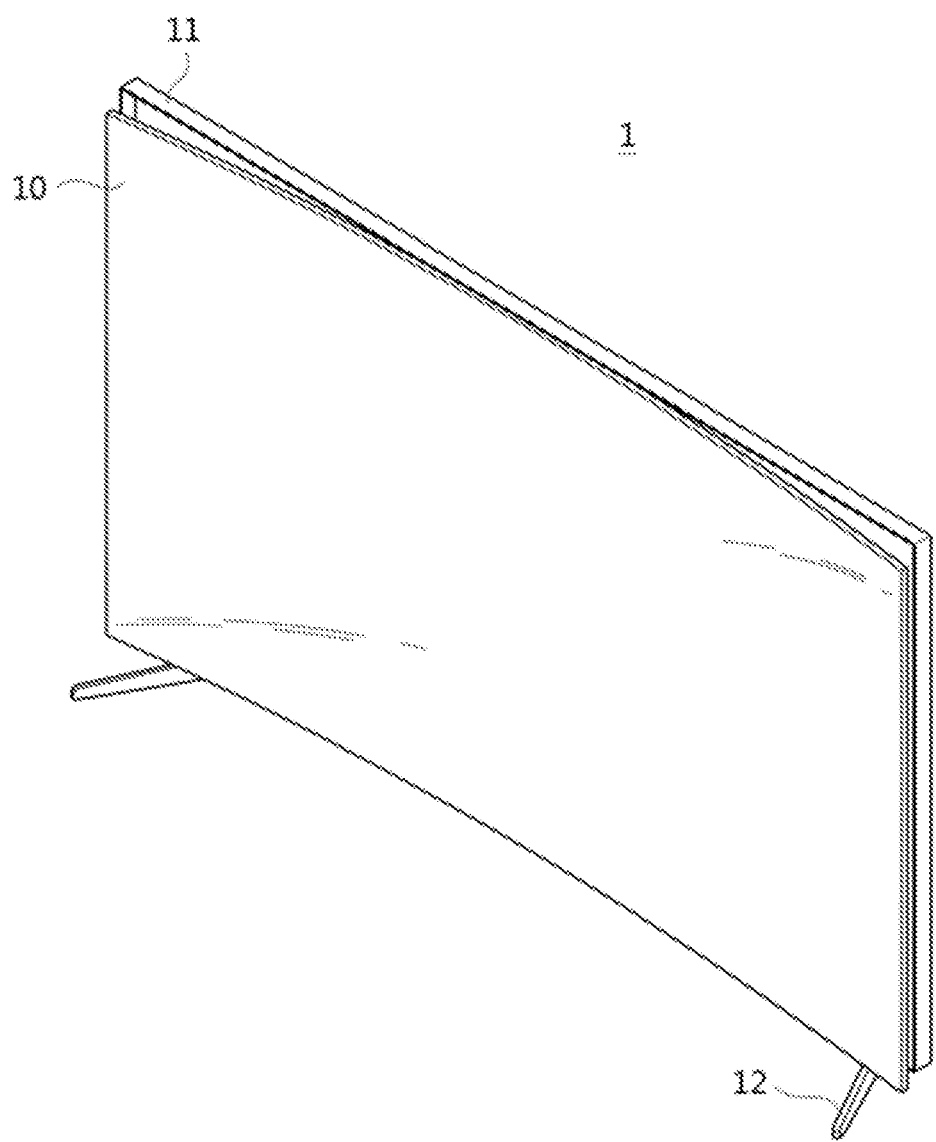
FIG. 2 is a perspective view showing a curved state of a display of a display apparatus according to an exemplary embodiment.

As shown in FIGS. 1 and 2, a display apparatus 1 includes a display module 10, i.e., a display, configured to display image information, and a case 11 disposed around the display module 10 and configured to protect the display module 10 and electronic parts therein.

The display module 10 includes a display panel, such as an organic light emitting diode (OLED) panel, and a base panel having a shape corresponding to the display panel and configured to support a rear surface of the display panel.

The case 11 may be formed to surround a front periphery and a rear surface of the display module 10.

A base 12 may be provided on a lower section of the case 11. The display module 10 and the base 12 may be connected by a stand 13 vertically provided on the base 12. The base 12 may hold the display apparatus 1 in an upright position on an installation surface.

The display module 10 is deformable, and side ends thereof can protrude forward from a center thereof to form a curve. As shown in FIGS. 1 and 2, the display module 10 may be formed to provide both a flat state and a curved state.

Figure 3:
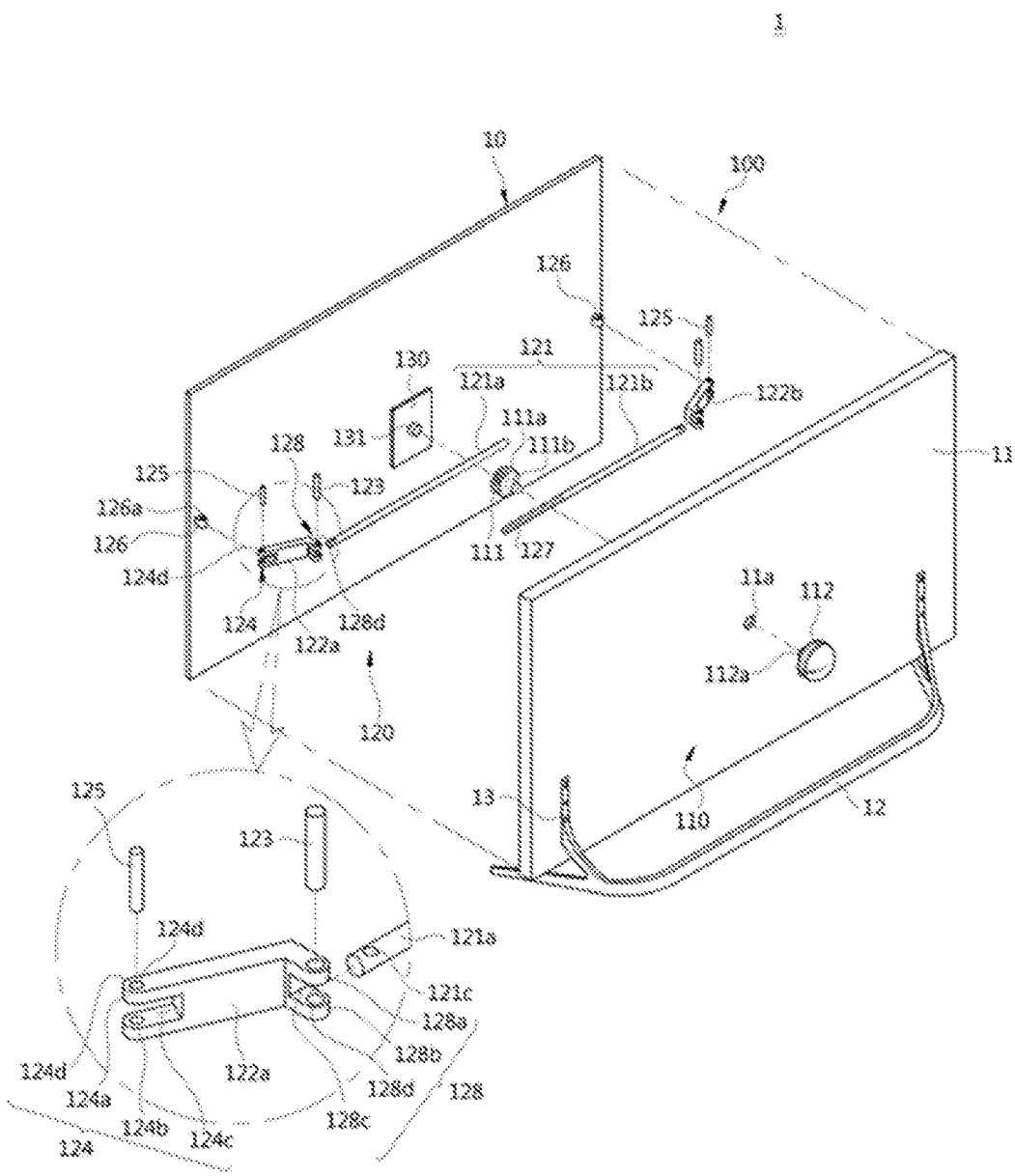
FIG. 3 is an exploded perspective view showing a deformation apparatus of a display apparatus according to an exemplary embodiment.
Figure 4:
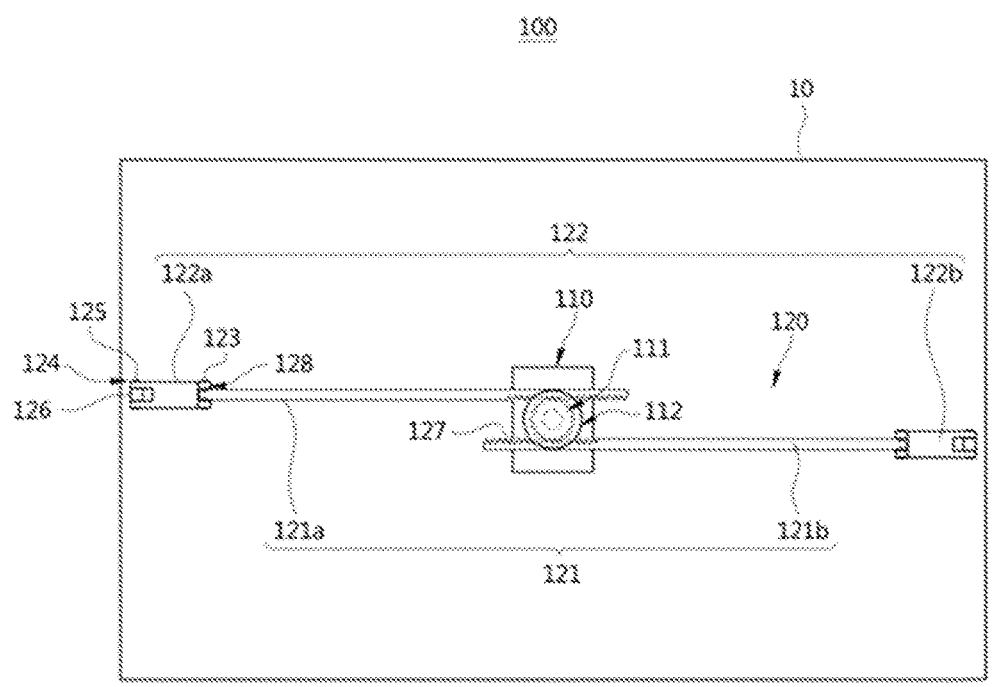
FIG. 4 is a plan view of a deformation apparatus of a display according to an exemplary embodiment.
Figure 5:
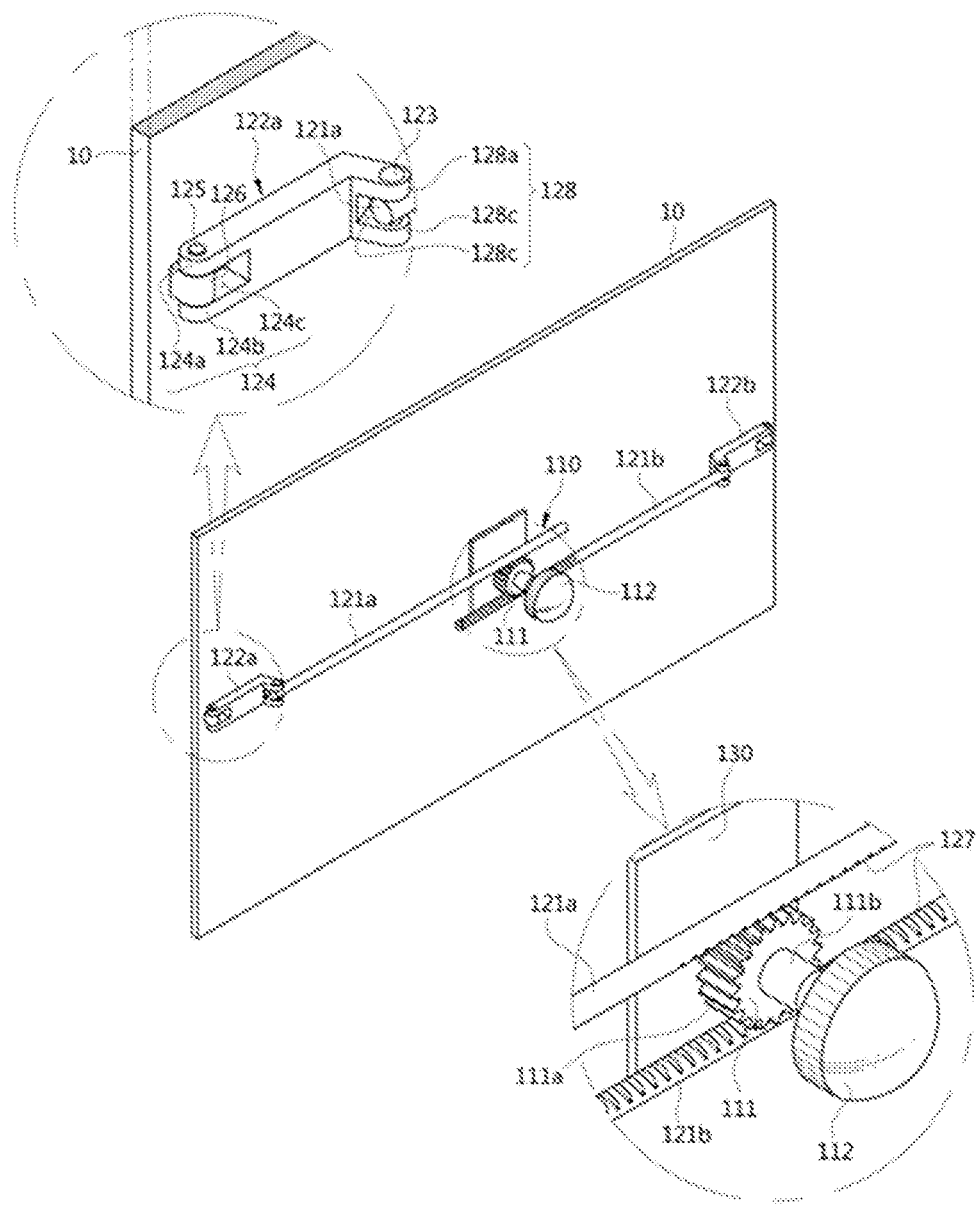
FIG. 5 is a perspective view of a handle unit of the deformation apparatus in a flat state of a display according to an exemplary embodiment.
Figure 6:
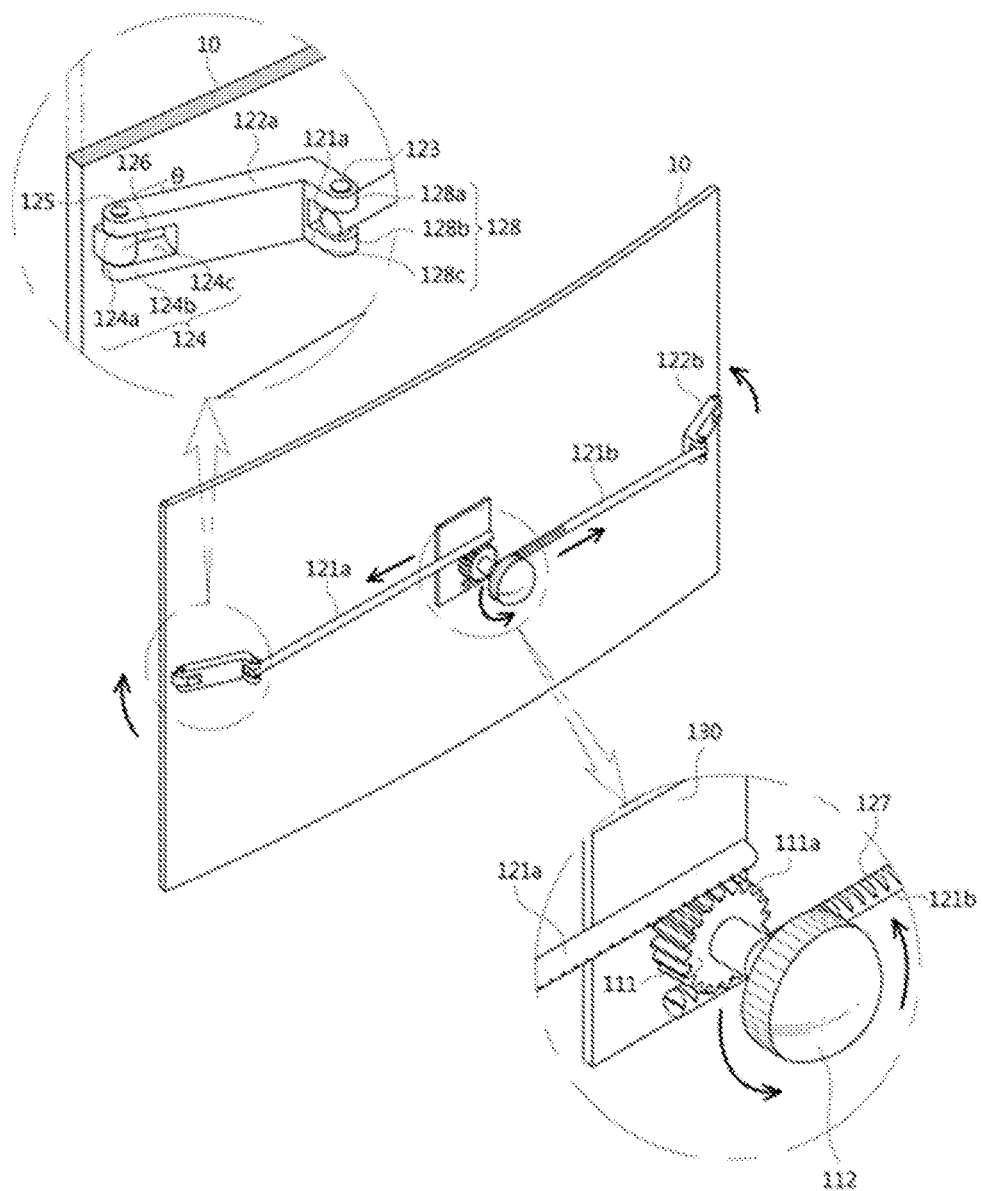
FIG. 6 is a perspective view of a handle unit of a deformation apparatus in a curved state of a display according to the exemplary embodiment.

The display apparatus 1 can include a deformation apparatus 100, i.e., a deformation unit, deformation mechanism, or deformer, (FIG. 3) provided to change the display module 10 between the flat state and the curved state.

The deformation apparatus 100 may be provided as a manual structure that can be directly manipulated by a user. The deformation apparatus may include a linear actuator that translates rotational motion into linear motion.

The display module 10 and the case 11 can be formed of a bendable material, and provided to be bent into a curved shape by the deformation apparatus 100.

As shown in FIGS. 3 to 6, the deformation apparatus 100 may be provided between the display module 10 and the case 11 to maintain a state in which side sections of the display module 10 are disposed at a forward side of the center to form a curved state.

The deformation apparatus 100 includes a handle unit 110 and a link unit 120, i.e., a rack, moved by a rotation of the handle unit 110 and configured to deform a curvature of the display module 10.

The handle unit 110 includes a rotary gear 111 provided behind a rear of the display module 10, and a rotary dial 112 configured to rotate the rotary gear 111.

The rotary dial 112 may be exposed to the outside of the display apparatus 1 such that a user can grip and directly rotate the rotary dial 112.

The rotary gear 111 is formed in a circular shape, and a first gear 111a is formed at an outer periphery thereof. The rotary gear 111 is provided on an installation bracket 130 installed at a center of a rear surface of the display module 10. A coupling protrusion 131 to which the rotary gear 111 is rotatably coupled may be formed at a center of the installation bracket 130.

A dial fixing protrusion 111b protrudes from a center of a surface of the rotary gear 111. The dial fixing protrusion 111b can be inserted and fixed into a dial fixing groove 112a formed in the rotary dial 112.

While the rotary gear 111 and the rotary dial 112 are shown coupled by the dial fixing protrusion 111b and the fixing groove 112a, one or more exemplary embodiments are not limited thereto. For example, the rotary gear 111 and the rotary dial 112 may be assembled in a threaded manner.

In addition, while the rotary dial 112 is shown formed in a hemispherical shape is shown, one or more exemplary embodiments are not limited thereto. For example, the rotary dial 112 may be formed in any shape that can be gripped by a user.

Further, an example in which the rotary gear 111 is rotatably provided on the installation bracket 130 installed on a rear surface of the display module 10 is shown, one or more exemplary embodiments are not limited thereto. For example, the rotary gear 111 may be installed on a rear of the display apparatus 1.

Meanwhile, a rotary dial installation section 111a through which the rotary dial 112 passes through the case 11 to be connected to the rotary gear 111 is formed in the case 11.

The rotary dial installation section 11a may be disposed at a center of the case 11.

Accordingly, when a user manually rotates the rotary dial 112 exposed to the outside of the case 11, the rotary gear 111 connected to the rotary dial 112 is rotated.

The link unit 120 includes movable links 121 engaged with the rotary gear 111 to be linearly moved by rotation of the rotary gear 111, and rotary links 122 are configured to rotatably connect to the movable links 121.

The movable links 121 may include a first movable link 121a connected to a first rotary link 112a of the rotary links 122, and a second movable link 121b connected to a second rotary link 112b of the rotary links 122.

The movable links 121 have a bar shape, and second gears 127 meshed with the first gear 111a may be formed in at least portions of the movable links 121. For example, the second gears 127 may be formed in a bottom surface end section of the first movable link 121a and an upper surface end section of the second movable link 121b.

Meanwhile, the first movable link 121a and the second movable link 121b may be provided to move in opposite directions according to rotation of the rotary gear 111.

Here, the first movable link 121a and the second movable link 121b are symmetrically moved such that curvatures of left and right sides of the display module 10 can be uniformly and simultaneously varied.

The rotary links 122 connect the movable links 121 and the display module 10. The rotary links 122 may include a first rotary link 122a configured to connect the first movable link 121a and the display module 10, and a second rotary link 122b configured to connect the second movable link 121b and the display module 10.

The rotary links 122 include rotary support sections 124 rotatably connected to the display module 10, and hinge support sections 128 rotatably connected to the movable links 121.

The rotary support section 124 includes a first rotary protrusion 124a protruding from an end section thereof, a second rotary protrusion 124b spaced apart from the first rotary protrusion 124a in a downward direction, and a rotary slot 124c formed in a space between the first rotary protrusion 124a and the second rotary protrusion 124b.

Rotary holes 124d are formed at corresponding positions of the first rotary protrusion 124a and the second rotary protrusion 124b. A rotary shaft 125 passes through the rotary holes 124d.

The rotary shaft 125 is configured to connect the display module 10 and the rotary link 122.

Here, the display module 10 has a rotary fixing section 126 to which the rotary support section 124 is rotatably connected. The rotary fixing section 126 may have a fixing hole 126a through which the rotary shaft 125 also passes.

Accordingly, the rotary fixing section 126 of the display module 10 is disposed in the rotary slot 124c, and the rotary shaft 125 passes through the rotary holes 124d and the fixing hole 126a to rotatably connect the first rotary link 122a to the display module 10.

In addition, the hinge support section 128 of the rotary link 122 is rotatably coupled to the rotary link 122.

The hinge support section 128 is angled away from the rotary support section 124 of the first rotary link 122a. The hinge support section 128 includes a first hinge protrusion 128a, a second hinge protrusion 128b spaced apart from a lower side of the first hinge protrusion 128a, and a hinge slot 128c formed in a space between the first hinge protrusion 128a and the second hinge protrusion 128b.

Hinge holes 128d may be formed in the first hinge protrusion 128a and the second hinge protrusion 128b. A hinge shaft 123 may pass through the hinge holes 128d.

The hinge shaft 123 rotatably connects the rotary link 122 and the movable link 121.

A hinge fixing hole 121c is formed in an end section of the rotary link 122. The hinge shaft 123 may additionally pass though the hinge fixing hole 121c.

Accordingly, one end section of the movable link 121 is disposed in the hinge slot 128c, and the hinge shaft 123 passes through the hinge holes 128d and the hinge fixing hole 121c to rotatably connect the rotary link 122 and the movable link 121.

As described above, the rotary link 122 is connected to the movable link 121 and, as the movable link 121 is moved, the rotary link 122 is rotated about the rotary shaft 125 of the rotary support section 124 to a predetermined angle θ to deform the display module 10.

While an example in which one deformation apparatus 100 of the embodiment is installed at a center of the display module 10 is shown, one or more exemplary embodiments are not limited thereto. For example, two deformation apparatuses may be disposed at upper and lower sections according to the size of the display apparatus.

Figure 7:
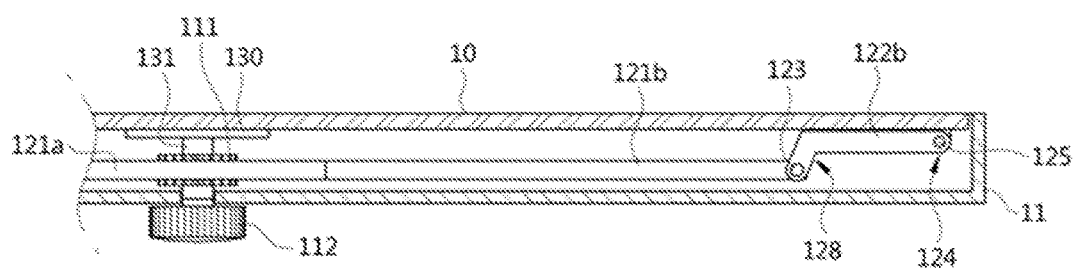
FIGS. 7 and 8 are top views showing a display in a flat state and a curved state according to an exemplary embodiment.
Figure 8:
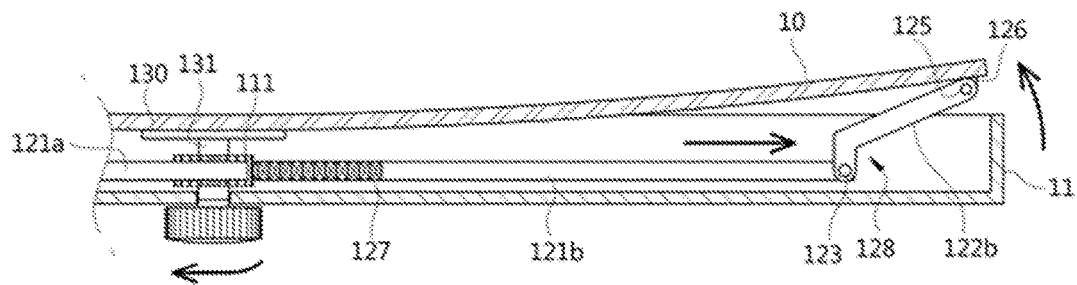

With reference to FIGS. 7 and 8, a deformation operation of the display module 10 of the display apparatus 1 by the deformation apparatus 100 will be described.

First, as shown in FIG. 7, the display module 10 of the display apparatus 1 can be used in a flat state.

When a user rotates the rotary dial 112 of the handle unit 110 of the deformation apparatus 100, the rotary gear 111 connected to the rotary dial 112 is rotated.

When the rotary gear 111 is rotated, the first movable link 121a and the second movable link 121b connected to the upper and lower sections of the rotary gear 111 are moved in opposite directions, i.e., opposite lateral directions of the display module 10.

The first rotary link 122a and the second rotary link 122b connected to the end sections of the first movable link 121a and the second movable link 121b by the hinge support sections 128 are connected to the display module 10 by the rotary support sections 124.

Here, the first rotary link 122a and the second rotary link 122b are rotated through the hinge support sections 128 and the rotary support sections 124.

The side sections of the display module 10 pivotally connected to the rotary support sections 124 of the first rotary link 122a and the second rotary link 122b are moved forward.

Accordingly, the curvatures of the side sections of the display module 10 are increased to move into the curved state.

The side sections of the display module 10 can be equally, or substantially equally, deformed according to rotation of the rotary dial 112 to form a symmetrical or substantially symmetrical curved surface, as shown in FIG. 8.

On the other hand, when a user rotates the rotary dial 112 in an opposite direction to return it to its original position, the first movable link 121a and the second movable link 121b return to their original positions, and thus the display module 10 is in the flat state.

Figure 9:
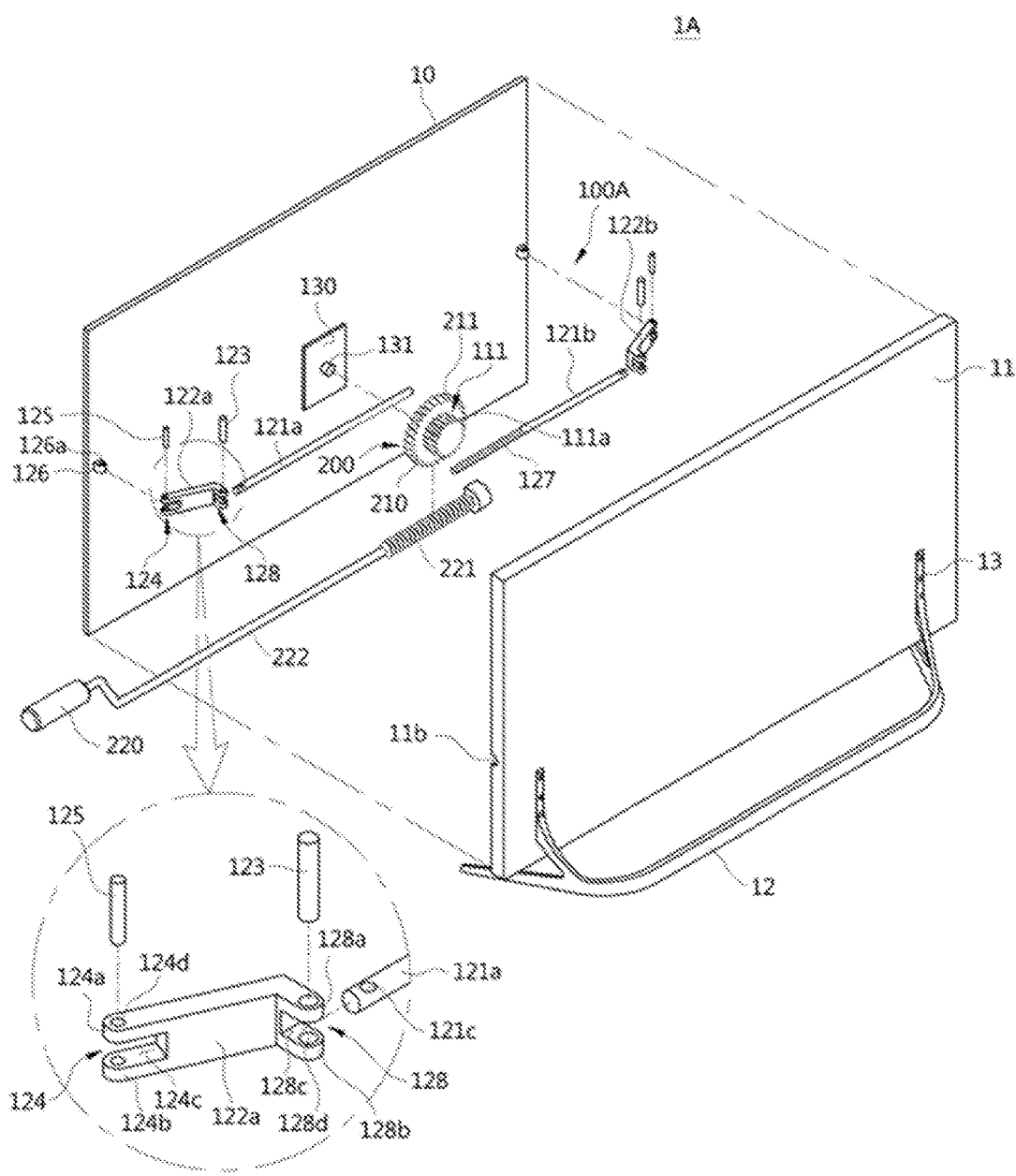
FIG. 9 is an exploded perspective view of a deformation apparatus of a display apparatus according to another exemplary embodiment.
Figure 10:
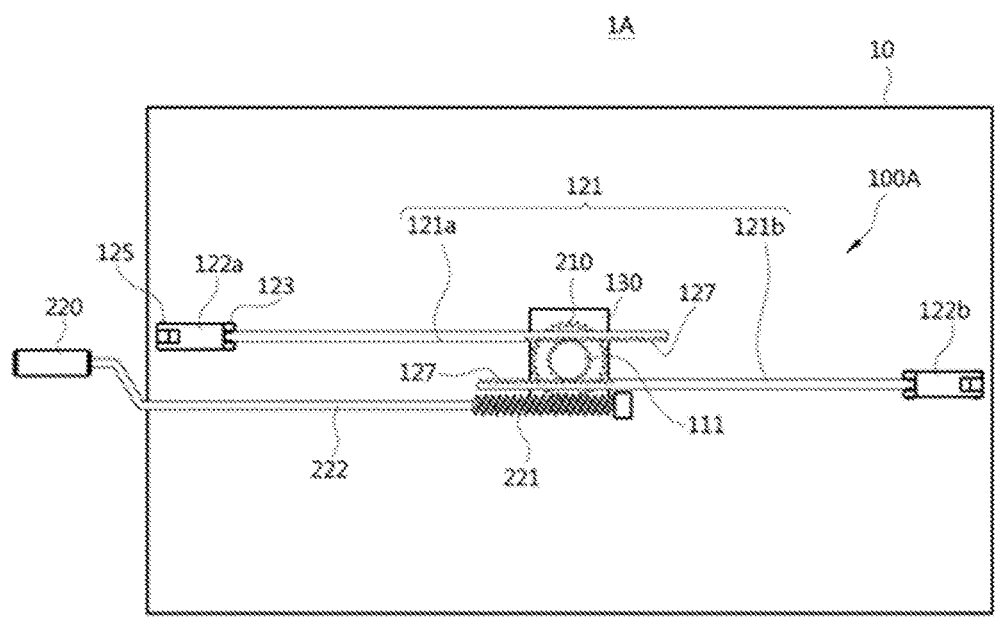
FIG. 10 is a plan view of a deformation apparatus of a display apparatus according to an exemplary embodiment.

As shown in FIGS. 9 and 10, a display apparatus 1A according to another exemplary embodiment includes a deformation apparatus 100A configured to deform the display module 10.

The deformation apparatus 100A includes a handle unit 110A (FIG. 11), and a link unit 120 moved by rotation of the handle unit 110A to vary a curvature of the display module 10.

The handle unit 110A may include a rotary gear 111 rotatably provided at the rear of the display module 10, and a handle 220 configured to rotate the rotary gear 111.

The handle 220 may be disposed to be exposed to the outside of the display apparatus 1A such that the handle 220 can be gripped and directly rotated by a user.

The rotary gear 111 includes a worm wheel 210 having a thread 211 formed around an outer periphery thereof.

In addition, the handle 220 includes a worm shaft 222 having a worm 221 configured to be meshed with the thread 211 of the worm wheel 210. The worm shaft 222 may be disposed perpendicular to the worm wheel 210.

The worm wheel 210 is provided to be fixed to the rotary gear 111.

Accordingly, when a user rotates the handle 220, the worm 221 formed at an end section of the worm shaft 222 of the handle 220 is rotated, and the worm wheel 210 meshed with the worm 221 is rotated.

The rotary gear 111 is meshed with the worm wheel 210 is also rotated.

The rotary gear 111 is formed in a circular shape and has a first gear 111a formed in an outer periphery thereof. The rotary gear 111 is rotatably provided on the installation bracket 130 installed at a center of a rear surface of the display module 10. The coupling protrusion 131 to which the rotary gear 111 is rotatably coupled may be formed at a center of the installation bracket 130.

Meanwhile, a fixing groove is formed at a center of a surface of the worm wheel 210. The fixing groove of the worm wheel 210 may be coupled to the coupling protrusion 131 of the installation bracket 130 provided to the rear of the display module 10.

Reference numeral 200 designates a rotary unit including the handle 220 and the rotary gear 111, which are provided to allow a user to input a rotational force to deform a curved state of the display module 10.

While an example in which the worm wheel 210 is rotatably installed at the installation bracket 130 provided at the rear surface of the display module 10 is shown, one or more exemplary embodiments are not limited thereto. For example, the worm wheel may be installed on the rear surface of the display apparatus 1.

In addition, while an example in which the handle 220 of the embodiment has a bar shape is shown, one or more exemplary embodiments are not limited thereto. For example, the handle may be formed in any shape that can be easily gripped and rotated by a user.

A handle installation section 111b is formed in the case 11 such that the handle 220 is connected to the worm wheel 210 through the case 11. The handle installation section 11b may be disposed at a center of one side of the case 11.

In addition, the handle 220 may be installed at the outside of the case 11 such that at least a portion of the handle 220 is exposed to be manually rotated by a user.

Accordingly, when a user manually rotates the handle 220 exposed to one side of the case 11, the worm wheel 210 connected to the worm 221 of the handle 220 is rotated, and the rotary gear 111 connected to the worm wheel 210 is rotated.

The link unit 120 connected to the rotary gear 111 to be linearly moved includes movable links 121 engaged with the rotary gear 111 and rotatably movable by rotation of the rotary gear 111, and the rotary links 122 configured to rotatably connect the movable links 121 and the display module 10.

The movable links 121 may include a first movable link 121a connected to a first rotary link 112a of the rotary links 122, and a second movable link 121b connected to a second rotary link 112b of the rotary links 122.

The movable links have a bar shape, and the second gears 127 may be formed in at least portions of the movable links 121 to be engaged with the first gear 111a. For example, the second gears 127 may be formed in a bottom surface end section of the first movable link 121a and an upper surface end section of the second movable link 121b.

Meanwhile, the first movable link 121a and the second movable link 121b may be configured to move in opposite directions according to rotation of the rotary gear 111.

Here, the first movable link 121a and the second movable link 121b may symmetrically move such that curvatures of left and right sides of the display module 10 can be substantially uniformly and simultaneously varied.

The rotary links 122 connect the movable links 121 and the display module 10. The rotary links 122 may include a first rotary link 122a configured to connect the first movable link 121a and the display module 10, and a second rotary link 122b configured to connect the second movable link 121b and the display module 10.

The rotary links 122 include the rotary support sections 124 rotatably connected to the display module 10, and the hinge support sections 128 rotatably connected to the movable links 121.

The rotary support section 124 includes a first rotary protrusion 128a protruding from an end section thereof, a second rotary protrusion 128b spaced apart from the first rotary protrusion 128a in a downward direction, and a rotary slot 128c formed in a space between the first rotary protrusion 128a and the second rotary protrusion 128b.

Rotary holes 124d are formed at corresponding positions of the first rotary protrusion 128a and the second rotary protrusion 128b. A rotary shaft 125 passes through the rotary holes 124d The rotary shaft 125 is configured to connect the display module 10 and the rotary link 122.

Here, the display module 10 has the rotary fixing section 126 to which the rotary support section 124 is rotatably connected. The rotary fixing section 126 may have the fixing hole 126a through which the rotary shaft 125 also passes.

Accordingly, the rotary fixing section 126 of the display module 10 is disposed in the rotary slot 128c, and the rotary shaft 125 passes through the rotary hole 124d and the fixing hole 126a to rotatably connect the first rotary link 122a to the display module 10.

In addition, the hinge support section 128 of the rotary link 122 is configured to be coupled to the rotary link 122.

The hinge support section 128 is angled with respect to the rotary support section 124 of the first rotary link 122a. The hinge support section 128 includes a first hinge protrusion 128a, a second hinge protrusion 128b spaced apart from a lower side of the first hinge protrusion 128a, and a hinge slot 128c formed in a space between the first hinge protrusion 128a and the second hinge protrusion 128b.

Hinge holes 128d may be formed in the first hinge protrusion 128a and the second hinge protrusion 128b. A hinge shaft 123 may pass through the hinge holes 128d.

The hinge shaft 123 rotatably connects the rotary link 122 and the movable link 121.

A hinge fixing hole 121c through which the hinge shaft 123 can pass is formed in an end section of the movable link 121.

Accordingly, one end section of the movable link 121 is disposed in the hinge slot 128c, and the hinge shaft 123 passes through the hinge holes 128d and the hinge fixing hole 121c to rotatably connect the rotary link 122 and the movable link 121.

While an example in which movable link has the second gear meshed with the first gear of the rotary gear is shown, one or more exemplary embodiments are not limited thereto. For example, the rotary gear may include a pinion gear. In addition, the movable link having the second gear may have a rack formed to be meshed with the pinion gear.

Figure 11:
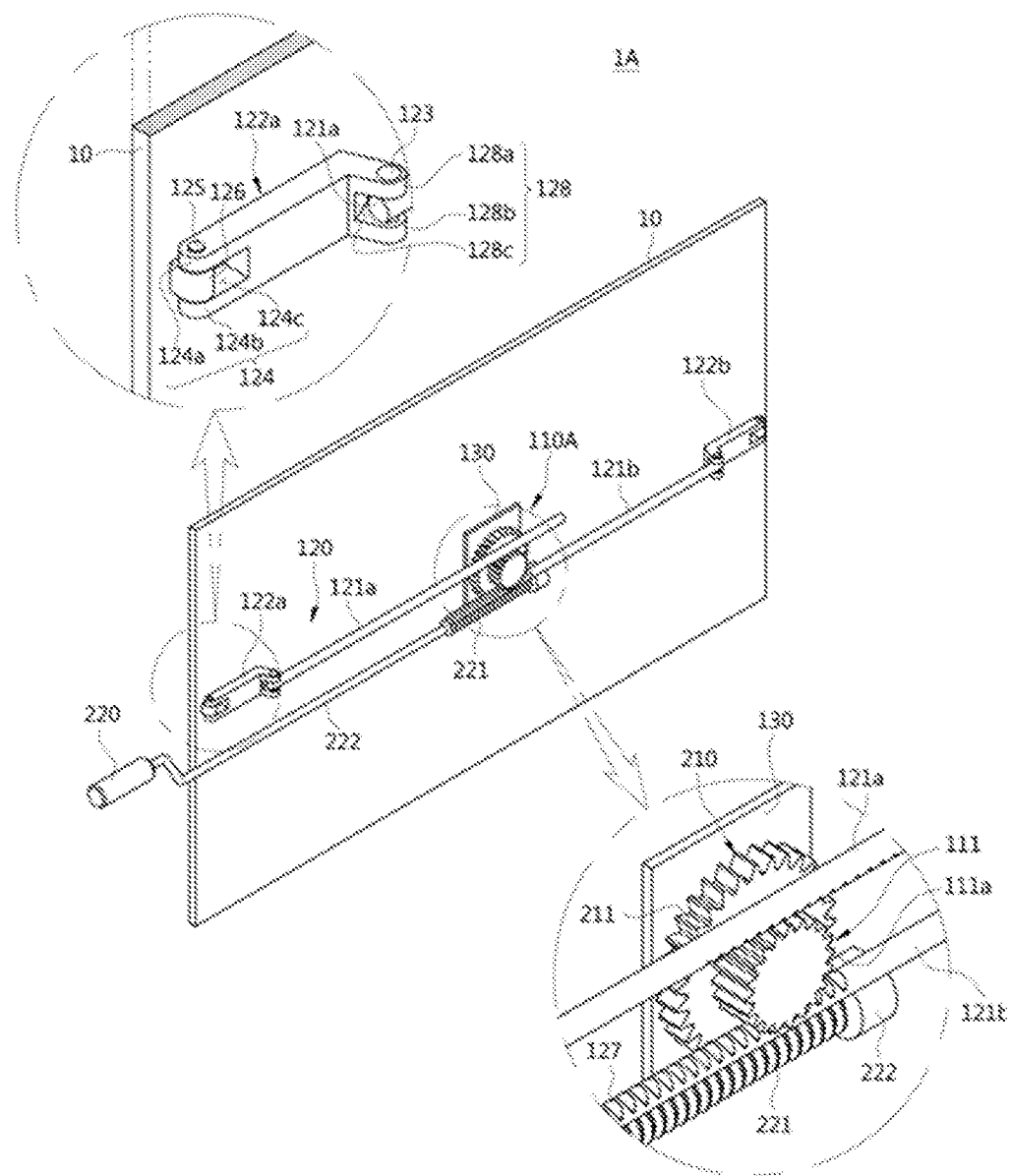
FIG. 11 is a perspective view of a handle unit of a deformation apparatus in a flat state of the display according to an exemplary embodiment.
Figure 12:
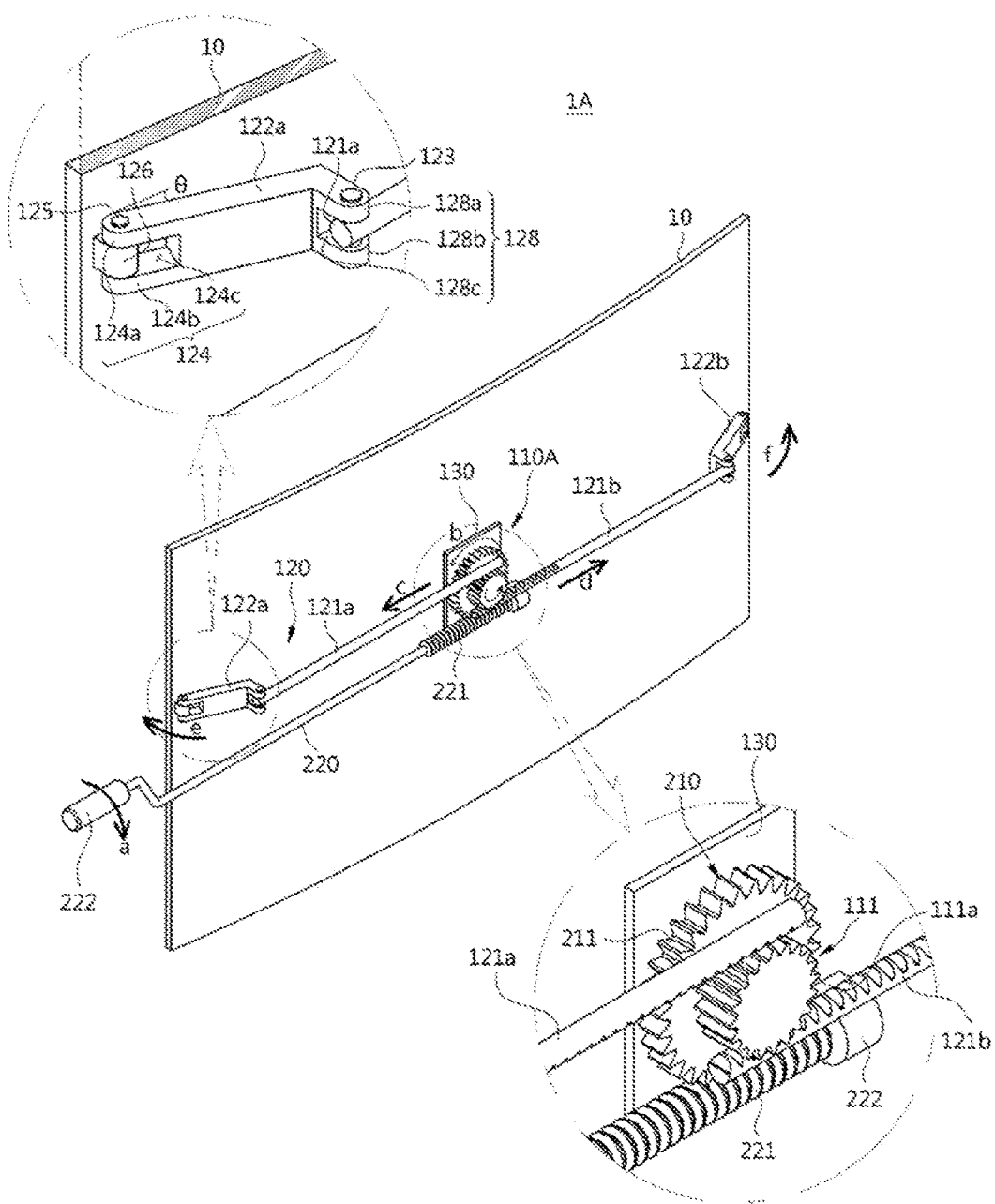
FIG. 12 is a perspective view of a handle unit of a deformation apparatus in a curved state of the display according to an exemplary embodiment.

As shown in FIGS. 11 and 12, deformation of the display module 10 by the deformation apparatus 100A of the display apparatus 1 according to an exemplary embodiment will be described.

First, as shown in FIG. 11, the display apparatus 1A is in a state in which the display module 10 has a flat shape.

When a user rotates the handle 220 of the deformation apparatus 100A exposed to the outside of the case 11 in a first direction a, the worm wheel 210 connected to the worm 221 of the worm shaft 222 of the handle 220 is rotated in a second direction b.

Here, the rotary gear 111 connected to the worm wheel 210 is also rotated in the second direction b.

When the rotary gear 111 is rotated in the second direction b, the first movable link 121a and the second movable link 121b having the second gears 127 meshed with the first gear 111a of the rotary gear 111 are moved in a third direction c and a fourth direction d, respectively.

Here, the third direction c and the fourth direction d are opposite directions.

When the first movable link 121a is moved in the third direction c, the first rotary link 122a connected to the first movable link 121a is rotated and moved forward.

In addition, when the second movable link 121b moves in the fourth direction d, the second rotary link 122b connected to the second movable link 121b is rotated and moved forward.

In this way, the display module 10 is deformed in a forward direction according to rotation of the first rotary link 122a and the second rotary link 122b connected to the first movable link 121a and the second movable link 121b.

Accordingly, both end sections of the display module 10 are moved forward from the center to form a curved shape as illustrated in FIG. 12.

On the other hand, when a user moves the handle 220 in a direction opposite to the first direction a, the worm wheel 210 connected to the worm 221 of the worm shaft 222 of the handle 220 is rotated in a direction opposite to the second direction b, and thus, the first movable link 121a and the second movable link 121b are returned to their original positions.

When the first movable link 121a and the second movable link 121b are returned, rotation of the first rotary link 122a and the second rotary link 122b are reversed, and thus, the curvature of the display module 10 is also returned to its original state.

As is apparent from the above description, according to one or more exemplary embodiments, the display module of the display apparatus can selectively use one of the flat state and the curved state.

In addition, since the deformation apparatus provided to deform the display module can more easily be provided, a manufacturing cost of the display apparatus may be reduced.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A display apparatus comprising:
   a display body comprising:
      a display configured to display an image; and
      a case disposed around an outside of the display;
   a handle unit disposed with at least a portion thereof outside the display body; and
   a link unit configured to linearly move and to vary a curvature of the display according to a rotational movement of the handle unit;
   wherein the handle unit comprises:
   rotary dial configured to be gripped and rotated by a user; and
   rotary gear disposed between a rear surface of the display and the case and configured to be rotated by a rotation of the rotary dial;
   wherein the link unit comprises:
   movable link comprising a gear meshed with the rotary gear; and
   a rotary link rotatably connected between the movably link and the display.

2. The display apparatus according to claim 1, wherein the movable link comprises:
   a first movable link connected to an upper end of the rotary gear; and
   a second movable link connected to a lower end of the rotary gear.

3. The display apparatus according to claim 2, wherein the first movable link and the second movable link are configured to be moved in opposite directions according to the rotation of the rotary gear.

4. The display apparatus according to claim 2, wherein the rotary link comprises:
   a first rotary support section rotatably connected to the display;
   a first hinge support section rotatably connected to the first movable link;
   a second rotary support section rotatably connected to the display; and
   a second hinge support section rotatably connected to the second movable link.

5. A display apparatus comprising:
   a display body comprising a display configured to display an image; and
   a deformation mechanism configured to change the display between a flat state and a curved state,
   wherein the deformation mechanism comprises:
      a handle unit configured to be moved by a user manipulation, and
      a link unit configured to linearly move according to a movement of the handle unit, wherein the handle unit comprises:
a rotary gear disposed behind the display; and
a rotary dial configure to rotate the rotary gear in response to the user manipulation,
wherein the link unit comprises:
a movable link comprising a gear meshed with the rotary gear; and
a rotary link rotatably connected to an end section of the movable link and rotatably connected to the display, and configure to deform the display in response to the user manipulation.

6. The display apparatus according to claim 5, wherein the movable link and the rotary link are coupled by a hinge.

7. The display apparatus according to claim 5, wherein the movable link comprises:
a first movable link connected to an upper end of the rotary gear; and
a second movable link connected to a lower end of the rotary gear.

8. The display apparatus according to claim 7, wherein the first movable link and the second movable link are configured to be moved in opposite directions according to the rotation of the rotary gear.

9. The display apparatus according to claim 5, wherein the rotary link comprises a rotary support section rotatably connected to an end section of the display.

10. A display apparatus comprising:
a display body comprising a display configured to display an image;
a pinion disposed behind the display;
a first rack connected to an upper section of the pinion configured to be moved in a first direction;
a second rack connected to a lower section of the pinion configured to be moved in a second direction opposite the first direction;
a first rotary link connected to the first rack and configured to deform a first side of the display;
a second rotary link connected to the second rack and configured to deform a second side of the display; and
a handle unit configured to rotate the pinion,
wherein the first rotary link is coupled to the first rack by a hinge and is rotatable with respect to the first rack, and
wherein the second rotary link is coupled to the second rack by a hinge and is rotatable with respect to the second rack.

11. The display apparatus according to claim 10, wherein the handle unit comprises:
a worm wheel connected to the pinion;
a worm shaft comprising a worm meshed with the worm wheel; and
a handle disposed on an end section of the worm shaft.

12. The display apparatus according to claim 11, wherein at least a portion of the handle is disposed outside of the display body.

* * * * *